US012603071B1

(12) United States Patent
Rubin

(10) Patent No.: US 12,603,071 B1
(45) Date of Patent: Apr. 14, 2026

(54) SYSTEM AND A METHOD FOR A GUITAR PICK WITH A MODULAR INTERCHANGEABLE INSERT

(71) Applicant: Michael Rubin, Bethesda, MD (US)

(72) Inventor: Michael Rubin, Bethesda, MD (US)

( * ) Notice: Subject to any disclaimer, the term of this patent is extended or adjusted under 35 U.S.C. 154(b) by 0 days.

(21) Appl. No.: 19/282,104

(22) Filed: Jul. 28, 2025

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
USPC ........................................................... 84/322
See application file for complete search history.

(56) References Cited

U.S. PATENT DOCUMENTS 7,186,908 B2 * 3/2007 Hodesh .................. G10D 3/173 84/320
2011/0265630 A1 * 11/2011 McKee .................. G10D 3/173 84/322

FOREIGN PATENT DOCUMENTS

AT 524090 A1 * 2/2022 ............... G10D 3/16

* cited by examiner

*Primary Examiner* — Jianchun Qin
(74) *Attorney, Agent, or Firm* — IdeaParlor Law; Anthony Whittington

(57) ABSTRACT

A modular guitar pick is provided. The modular guitar pick comprises a pick body including a tip portion configured to engage a string of a musical instrument, a gripping portion for manual control, and a body region between the tip portion and the gripping portion. The gripping portion includes an ergonomic grip layer formed of a material differing from that of the pick body.

20 Claims, 10 Drawing Sheets

104

205

SYSTEM AND A METHOD FOR A GUITAR PICK WITH A MODULAR INTERCHANGEABLE INSERT

CROSS-REFERENCES TO RELATED APPLICATIONS

N/A.

FIELD OF THE TECHNOLOGY

The present disclosure relates broadly to the field of musical instrument accessories, and more specifically to the field of plectra-commonly referred to as guitar picks—used for plucking or strumming the strings of a variety of fretted and non-fretted string instruments.

DESCRIPTION OF THE RELATED ART

Guitar picks, also known as plectra, have been used for centuries by musicians seeking to produce consistent, articulate, and dynamic sounds from fretted stringed instruments. From the earliest tortoiseshell picks of the 19th century to today's array of plastic, metal, and composite alternatives, picks have evolved primarily along a single axis: variations in shape and material at the point of contact with the string. Despite incremental innovations over time, the majority of modern guitar picks remain single-bodied, monolithic implements with fixed mass, geometry, and material properties. These conventional designs are inexpensive and effective for general playing but offer limited capacity for on-the-fly tonal or ergonomic customization.

The most common types of guitar picks in use today differ in size (standard vs. jazz), thickness (thin, medium, heavy, extra heavy), and material (celluloid, nylon, Delrin, Ultem, acrylic, wood, or metal). Musicians often select picks to suit particular playing styles or genres—thin picks for strumming, thick picks for lead work, and so on. However, these selections are relatively coarse, and changing tonal profile or tactile feel typically requires switching out the entire pick. This can be cumbersome during performance or recording sessions, where tonal precision and continuity are vital.

Over the years, several attempts have been made to refine the tactile grip of the pick through the use of embossing, laser-etching, rubberized coatings, and even multi-layered laminated picks. Other inventors have focused on modifying the tip geometry—for example, picks with beveled edges, sharper angles, or proprietary textures to enhance attack or reduce string drag. While these innovations have merit, they tend to concentrate on a single design feature: the interface between the pick and the string. As a result, they overlook the broader acoustical system of which the pick is a part, including how energy flows through the full structure of the pick during play.

It is important to understand that when a string is plucked, the pick does not merely transfer energy to the string; it also absorbs, reflects, and resonates with vibrational energy. This interaction is influenced not only by the stiffness and shape of the pick tip but also by the mass distribution, damping, and resonance of the entire pick body. A pick with more centralized mass may feel more controlled or weighted in the hand, while one with edge-centric mass might transmit more vibration or exhibit flutter. The feel and tone that result from these properties are difficult to quantify, but experienced players often describe them in terms such as "snappy," "punchy," "round," "warm," or "stiff." These descriptors correlate with real physical parameters, including compliance, moment of inertia, resonance frequency, and energy dissipation.

Currently, the only way to alter such deeper structural properties is to switch picks entirely, which is not always ideal. A musician may love the shape and tip of a particular pick but wish it had a different weight, feel, or sound. Alternatively, they may find that the same pick sounds great in one context (e.g., on a steel-string acoustic) but overly harsh or soft in another (e.g., on a jazz archtop). No commercial solution exists that allows a musician to adjust the internal mechanical behavior of a pick without also changing its tip or external profile.

Additionally, the field of modular musical accessories has generally lagged behind innovations in other industries, such as sports equipment, tools, or consumer electronics. While musicians can change pickups on guitars, swap amp presets, or customize pedalboards, the pick remains a largely static tool. This is surprising given that it is one of the most directly interactive components in the signal chain. A small change in pick feel or behavior can have a disproportionate effect on tone, attack, and musical phrasing. Yet, no mainstream solution allows for modularity in the body of the pick—the area where mass distribution and structural resonance originate.

What is needed is a system, device, and method that introduces a scalable, physics-informed system that allows musicians to shape tone and tactile feedback from the inside out.

SUMMARY

In an embodiment, a system is provided. The system includes a modular guitar pick comprising: a pick body including a tip portion configured to engage a string of a musical instrument, a gripping portion for manual control, and a body region between the tip portion and the gripping portion; wherein the body region defines a cavity configured to receive an interchangeable insert; wherein the gripping portion includes an ergonomic grip layer formed of a material differing from that of the pick body, the grip layer selected to enhance tactile control, reduce slippage, or improve comfort; and wherein the insert is formed from a material differing from that of the pick body in at least one of: stiffness, density, damping coefficient, or modulus of elasticity, such that the insert alters the vibrational response characteristics of the pick during use without contacting the instrument string.

In another embodiment, a device is provided. A device includes a modular guitar pick comprising: a pick body including a tip portion configured to engage a string of a musical instrument, a gripping portion for manual control, and a body region between the tip portion and the gripping portion; wherein the body region defines a cavity configured to receive an interchangeable insert; wherein the gripping portion includes an ergonomic grip layer formed of a material differing from that of the pick body, the grip layer selected to enhance tactile control, reduce slippage, or improve comfort; and wherein the insert is formed from a material differing from that of the pick body in at least one of: stiffness, density, damping coefficient, or modulus of elasticity, such that the insert alters the vibrational response characteristics of the pick during use without contacting the instrument string.

In still another embodiment, a method is provided. The method allows for altering the tonal and vibrational characteristics of a guitar pick, comprising the steps of: providing a guitar pick body having a cavity in its body region; selecting an insert from a set of pre-manufactured inserts, each formed from a different material and having known mechanical properties; placing the selected insert into the cavity; and using the resulting pick to strike a stringed instrument, wherein the insert modifies the pick's natural frequency of vibration and/or damping behavior without altering the contact tip of the pick.

BRIEF DESCRIPTION OF THE DRAWINGS

The present invention is described in detail below with reference to the attached drawing figures, which are incorporated by reference herein and wherein.

DETAILED DESCRIPTIONS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent application, which would still fall within the scope of the claims.

It should also be understood that, unless a term is expressly defined in this patent using the sentence, there is no intent to limit the meaning of that term, either expressly or by implication, beyond its plain or ordinary meaning, and such term should not be interpreted to be limited in scope based on any statement made in any section of this patent application (other than the language of the claims). To the extent that any term recited in the claims at the end of this patent application is referred to in this patent application in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

In an embodiment, the present invention comprises a modular guitar pick that enables tonal and ergonomic customization through the inclusion of an interchangeable insert located within the body of the pick. This insert is designed to alter the internal mechanical and vibrational properties of the pick in ways that affect sound production and tactile feedback—without changing the geometry or material of the tip that makes direct contact with the guitar strings.

1. Overall Construction

Figure 1:
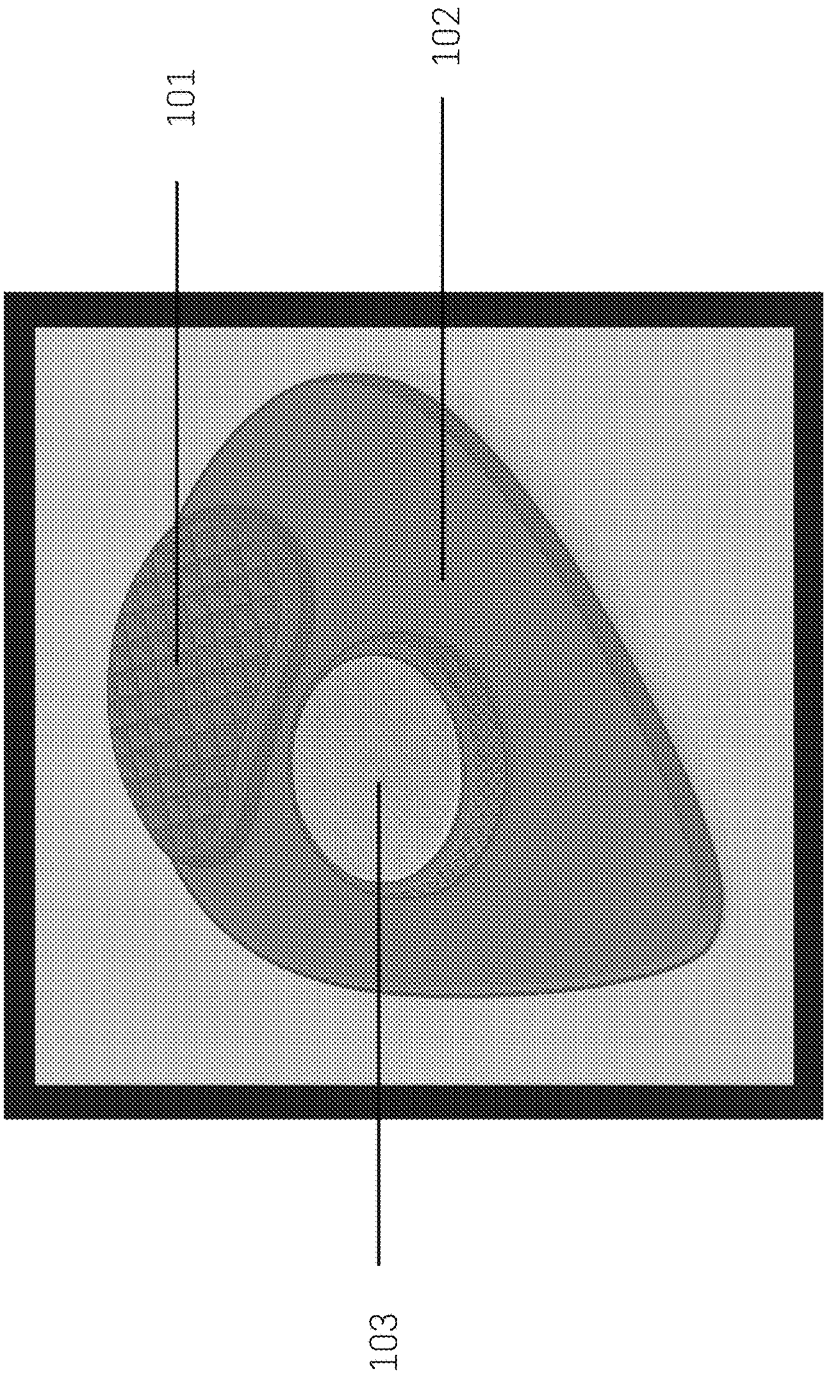
FIG. 1 is a front perspective view of the modular guitar pick, illustrating the overall shape of the pick body, the grip region, and the central cavity that houses the interchangeable insert illustrating an exemplary embodiment of the invention.

In an embodiment, the present invention comprises a modular guitar pick system consists of three main components:

(1) Pick body: The base structural frame of the pick, incorporating the tip, structural contour, and internal cavity designed to receive the modular insert. The body is typically fabricated from a durable material such as Ultem, nylon, or polycarbonate, providing mechanical stability and consistent performance. The pick body 102, shown in FIGS. 1, 3, 4, and 6, constitutes the primary structural element of the modular guitar pick and serves as the foundational platform to which other functional components are affixed or integrated. In FIG. 1, pick body 102 is illustrated in top plan view, demonstrating its overall outline geometry, which may be teardrop-shaped, triangular, or otherwise contoured to suit various playing styles. The body 102 is dimensioned for ergonomic compatibility with the human hand, typically ranging in thickness from approximately 0.5 mm to 3.0 mm, though other thicknesses may be employed depending on design intent and tonal objectives.

Figure 3:
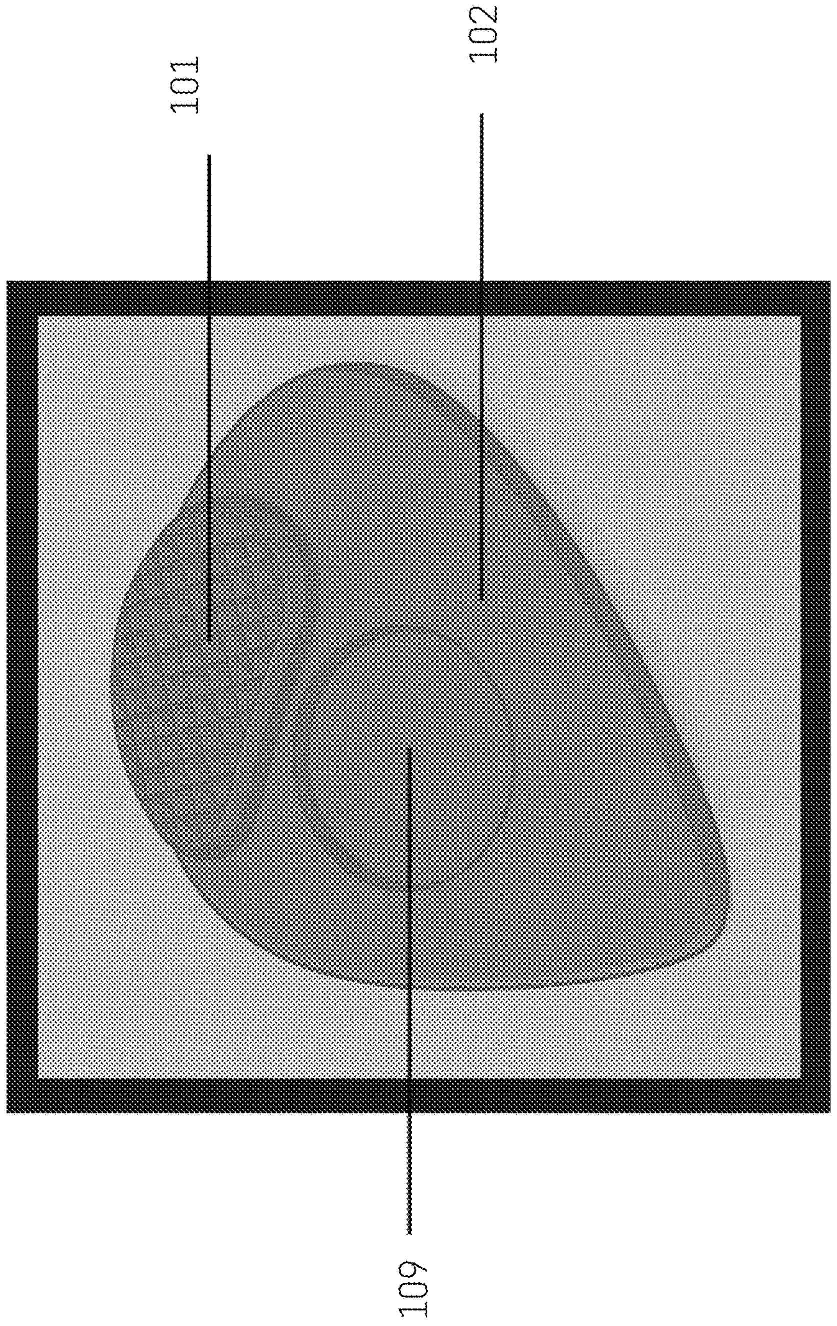
FIG. 3 is a front elevation view of the pick body without the insert in place, showing the cavity as an empty region within the central portion of the pick body in accordance with another exemplary embodiment of the invention.
Figure 4:
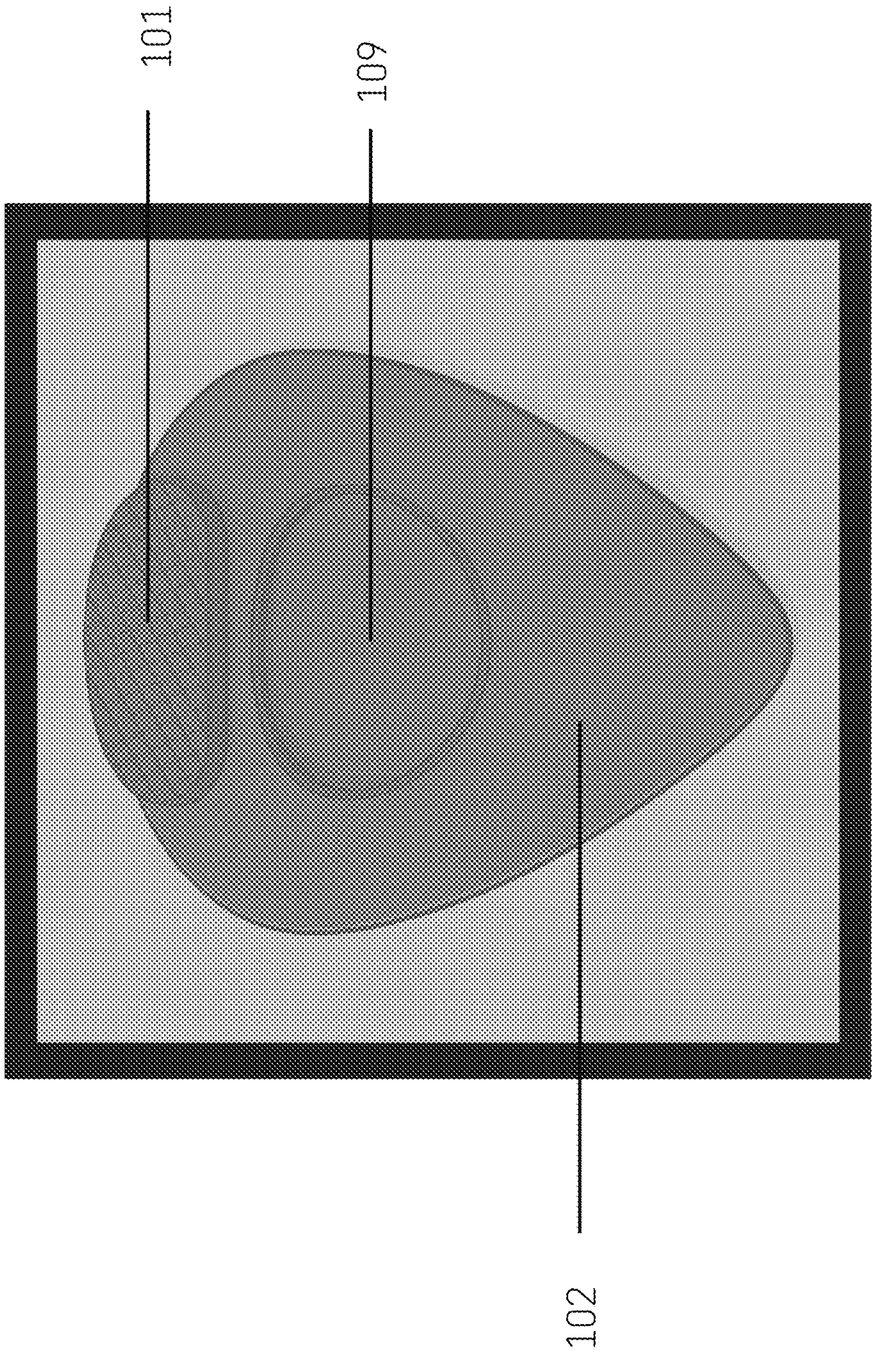
FIG. 4 is a top plan view of the pick body, detailing the location and geometric dimensions of the cavity designed to receive the insert in accordance with another exemplary embodiment of the invention.
Figure 6:
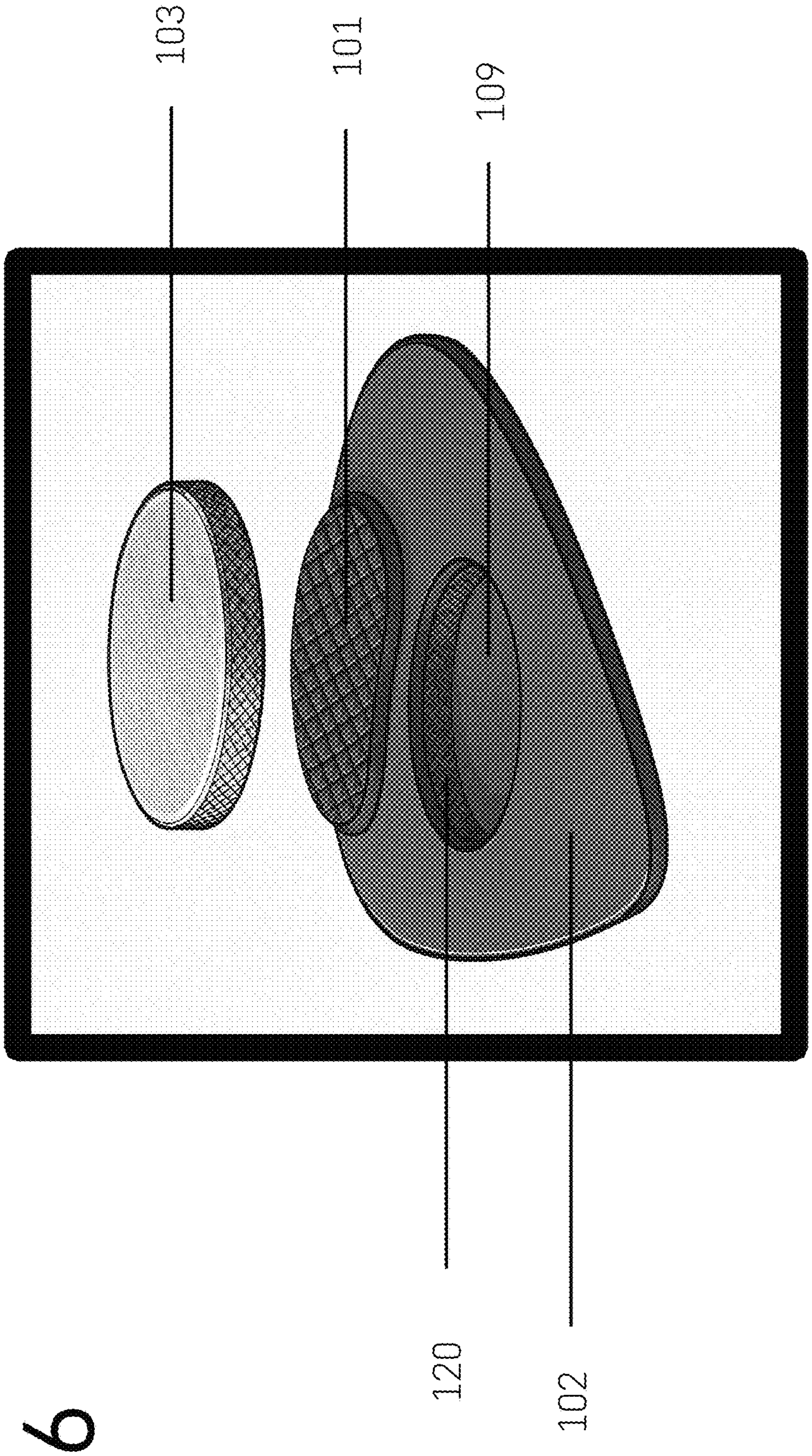
FIG. 6 is an exploded view of the modular pick assembly, including the pick body and a representative insert separated along the central axis, showing how the insert is designed to fit into the cavity in accordance with another exemplary embodiment of the invention.

In FIG. 3, pick body 102 is displayed in perspective, highlighting the surface contours, edge bevels, and any recesses, mounting interfaces, or embedded tracks intended to receive auxiliary components such as grip 101 or a modular insert. FIG. 4 provides a cross-sectional view of the body 102, revealing internal features such as cavities, reinforcement ribs, or interfacing regions that support structural rigidity while minimizing material use and optimizing vibration transmission. In FIG. 6, body 102 is shown in partial cutaway to demonstrate the integration of internal features or nested inserts, including resonance-modulating elements or interchangeable tone-enhancing modules.

The pick body 102 may be fabricated from a wide range of materials including but not limited to thermoplastics (e.g., nylon, Delrin, polycarbonate), wood, metal, carbon fiber, or hybrid composites. Its material selection may be tailored to influence tonal output, stiffness, flexibility, and pick attack characteristics. In embodiments incorporating a modular insert, the body 102 includes a receiving cavity or anchoring mechanism that enables secure placement and retention of said insert during dynamic playing conditions. Additionally, the body 102 may include aesthetic or functional surface treatments such as engraving, color-coding, or embedded microtextures to assist in orientation and visual differentiation. The body 102 is central to the invention's novel configuration, acting both as a standalone playable component and as a chassis for modular customization.

Figure 2:
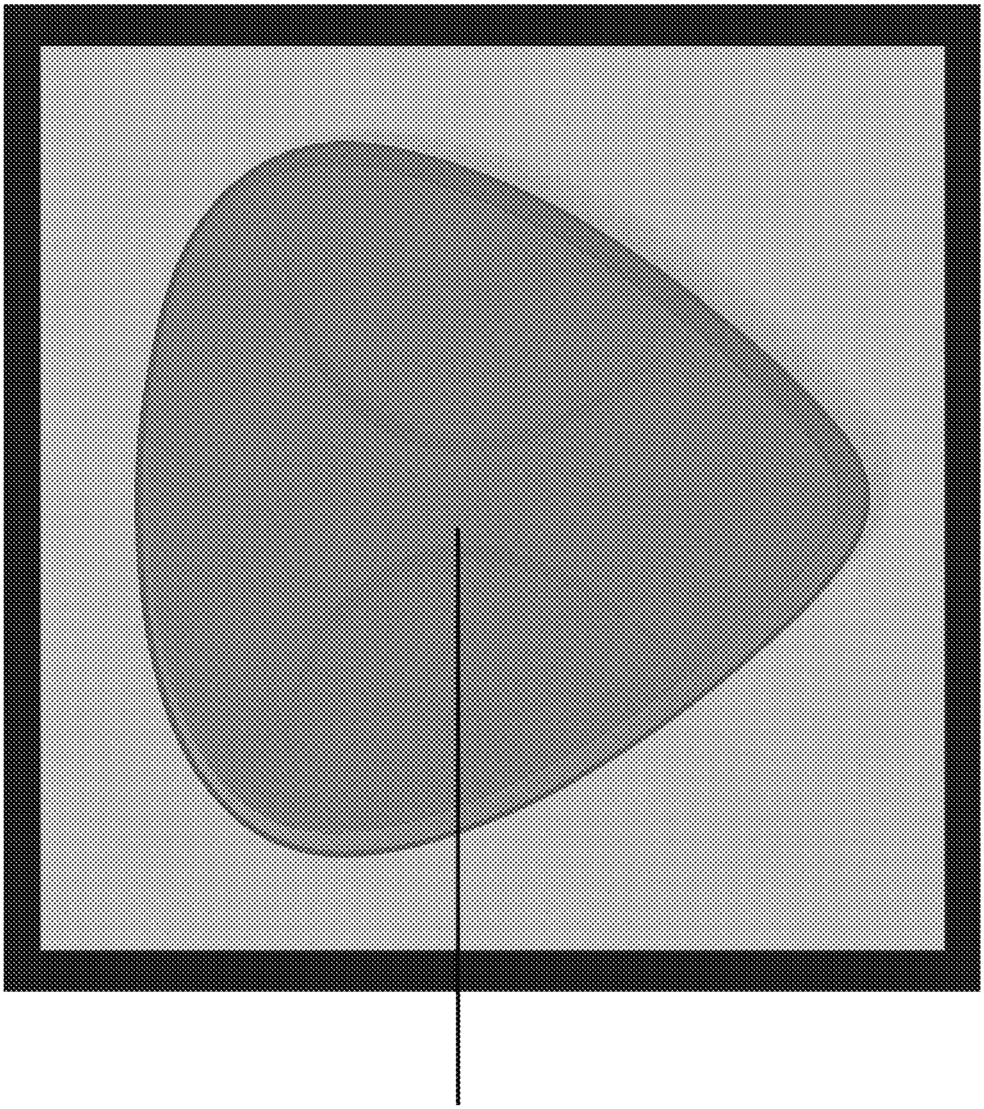
FIG. 2 is a rear perspective view of the pick, showing the opposite surface and emphasizing symmetry in the contouring of the pick body in accordance with another exemplary embodiment of the invention.

The back surface 104 of the pick body 102 is shown in FIG. 2, which presents a bottom plan view of the invention. This surface represents the reverse side of the primary structural component and may be either planar or contoured, depending on ergonomic and acoustic design considerations. Back surface 104 may be smooth or include functional features such as texture zones, grip-enhancing patterns, or branding embossments, and it may serve both aesthetic and mechanical purposes.

In certain embodiments, the back surface 104 functions as a structural anchor for internal components such as the interchangeable body insert 103. It may include a recessed region or retaining feature that secures the underside of the insert when seated. Additionally, surface 104 may interface with the user's thumb or index finger depending on grip orientation, thereby influencing tactile feel and control. As such, optional friction-modulating treatments—such as raised nodules, matte finishes, or surface etching—may be applied to improve user handling and reduce slippage during performance.

The back 104 may also house secondary features such as ventilation channels, balancing recesses, or identification markings. In embodiments involving a hollow or partially hollow pick body 102, back surface 104 may act as a removable or semi-permanent cover, constructed from the same or a distinct material to tune mass and acoustic reflection. Suitable materials for back surface 104 include rigid or semi-rigid polymers, composite laminates, carbon fiber, or lightweight metals, chosen in accordance with the pick's intended stiffness, durability, and tonal profile.

Back surface 104 plays a role in overall mass distribution, which affects the pick's rotational inertia and dynamic responsiveness. Its geometry and material properties may be optimized to either dampen or enhance vibrational feedback, contributing to the pick's customized tonal response and playing feel.

Figure 5:
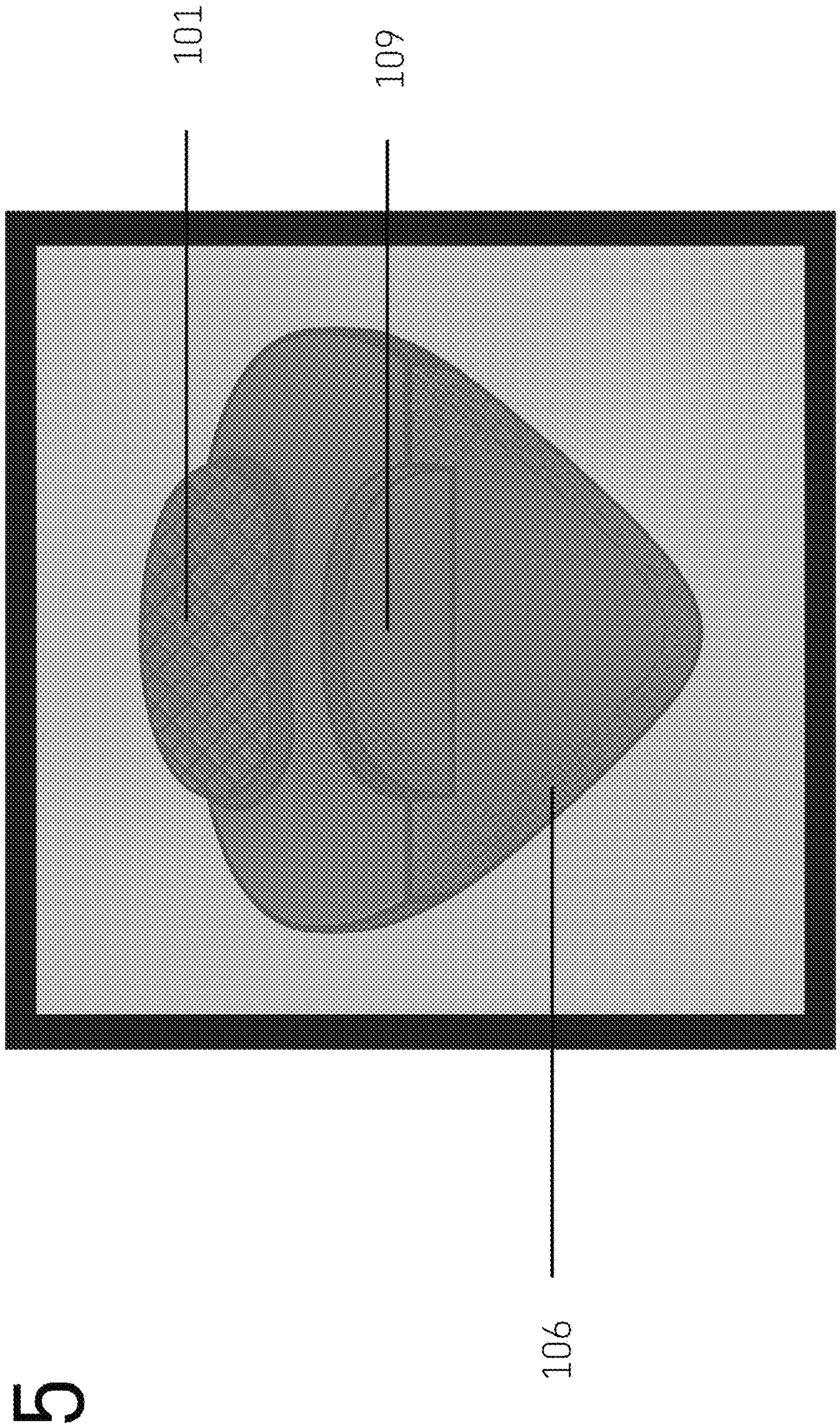
FIG. 5 a cross-sectional view taken along line A-A of FIG. 4, illustrating the depth and profile of the insert cavity and its flush interface with the pick surface illustrating an exemplary embodiment of the invention.

The tip 106, as illustrated in FIG. 5, refers to the terminal, string-engaging portion of the pick body 102, positioned at the lowermost edge opposite the grip 101. This region is the principal point of contact between the pick and the strings during play and is thus critical in shaping the tonal character, articulation dynamics, and responsiveness of the instrument.

In FIG. 5, tip 106 is shown in profile view as part of the assembled pick configuration, emphasizing its geometry, orientation, and edge finish relative to the remainder of the pick body. The tip may be formed with a sharpened, rounded, or beveled contour, each variation influencing pick attack, glide, and tonal brightness. For example, a finely pointed tip 106 may provide sharper, more percussive strikes, whereas a broader or rounded tip may produce warmer, smoother tonal transitions. The tip may be symmetrical or asymmetrical, depending on whether it is optimized for ambidextrous use, directional picking, or a specific technique such as tremolo or sweep picking.

The thickness and tapering of tip 106 gradually transition from the main body 102, and in some embodiments may exhibit flexion properties that contribute to dynamic tonal response based on playing pressure and angle of attack. Tip 106 may be constructed integrally with the pick body, or alternatively reinforced with a distinct material such as hardened polymer, metal alloy, or a wear-resistant laminate to extend durability and enhance string articulation over time.

Textural modifications such as micro-etching, serrations, or grooves may optionally be applied to tip 106 to adjust string contact friction, improve tactile feedback, or introduce specialized performance effects. Additionally, the tip's surface finish—whether polished, matte, or composite-coated—may further influence tonal brightness, glide resistance, and mechanical behavior.

As the interface between player and string, tip 106 is a critical component of the invention, working in tandem with the modular insert 103 and grip 101 to provide a customizable, performance-optimized playing experience.

(2) Interchangeable body insert: A removable module designed to fit securely within the central cavity of the pick body. This insert may vary in material composition, density, stiffness, damping characteristics, and surface texture. The choice of insert material directly influences the vibrational feedback and tonal characteristics of the pick through mechanical coupling, even without direct string contact. The interchangeable body insert 103, depicted in FIGS. 1, 6, 7, and 8, comprises a modular component removably coupled to the main pick body 102 and designed to influence the tonal, tactile, and mechanical properties of the guitar pick. This element enables user customization of pick performance characteristics—including resonance, stiffness, mass distribution, and attack behavior—through selective insertion and replacement of differently configured inserts.

In FIG. 1, insert 103 is shown in top plan view nested within a corresponding recess or housing in pick body 102, conforming geometrically to the surrounding boundaries for a seamless fit. Its placement may be central, offset, or symmetrical, depending on the embodiment, and is oriented to align with zones of maximal vibration transfer during string contact. In FIG. 6, insert 103 is seen in partial cutaway, highlighting its seated engagement within the interior cavity of pick body 102. This figure also illustrates potential fastening or stabilization mechanisms, such as press-fit grooves, magnetic interfaces, snap-lock tabs, or frictional retention systems that ensure secure operation during playing.

Figure 7:
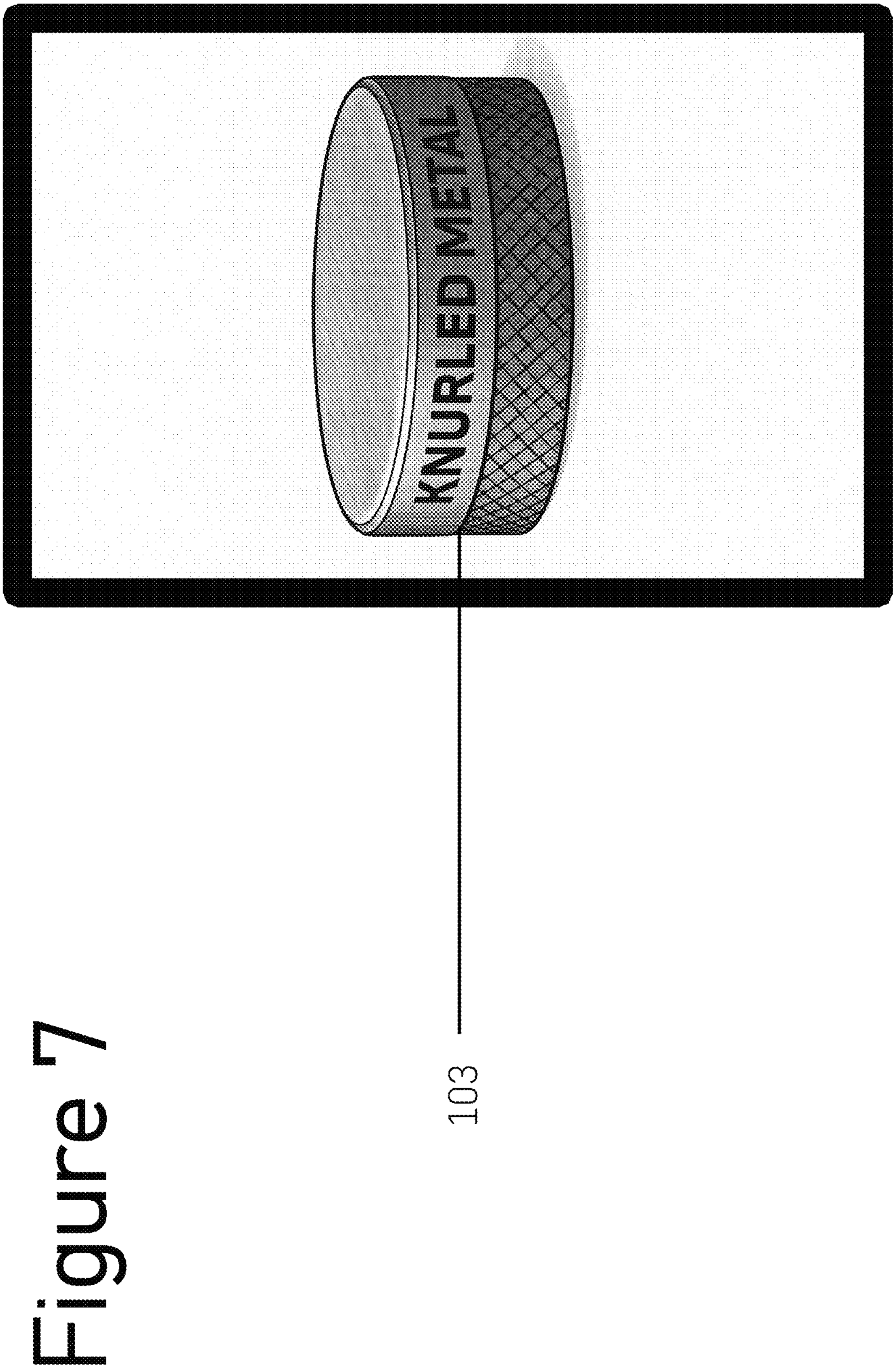
FIG. 7 is a side elevation view of the interchangeable insert alone, highlighting its shape, thickness profile, and material label or identification marker in accordance with another exemplary embodiment of the invention.
Figure 8:
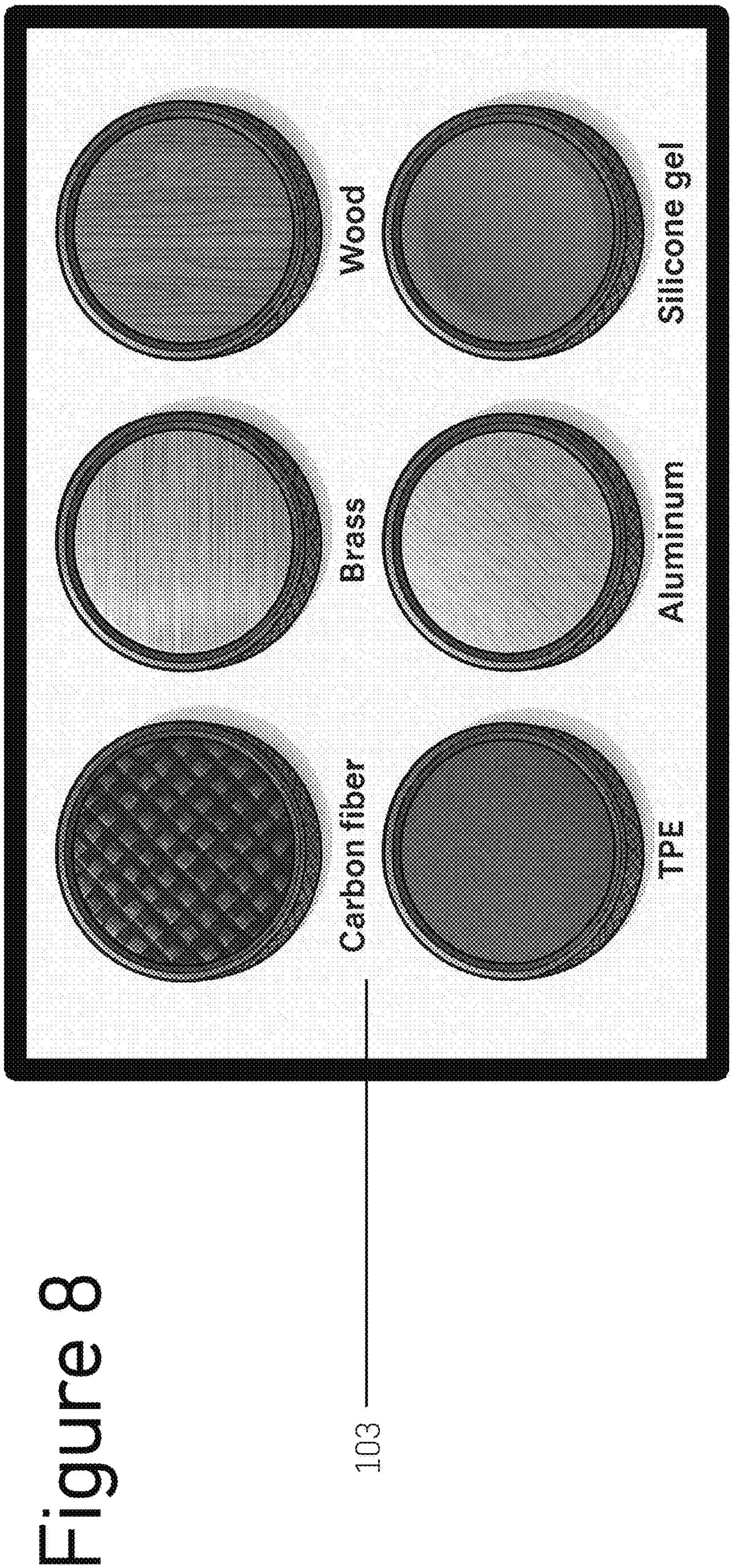
FIG. 8 is a diagram illustrating multiple interchangeable inserts, each made from different materials (e.g., carbon fiber, brass, wood, TPE, aluminum, silicone gel), and indicating tonal characteristics such as brightness, warmth, and resonance in accordance with another exemplary embodiment of the invention.

FIGS. 7 and 8 present isolated and exploded views, respectively, of interchangeable body insert 103. These figures detail the insert's geometry, material composition, and mechanical interfacing surfaces. In some embodiments, insert 103 may include protruding tabs, alignment notches, or flexing fins to facilitate precise positioning and removal. The insert itself may be fabricated from a broad range of materials selected to impart unique tonal characteristics—including, but not limited to, metal alloys (e.g., brass, aluminum, stainless steel), hardwoods, thermoset plastics, carbon fiber, ceramics, or resin composites. The choice of insert material, shape, and mass distribution can significantly affect sonic outcomes such as brightness, warmth, attack sharpness, and harmonic resonance.

Furthermore, interchangeable insert 103 may optionally incorporate internal structures such as resonance channels, weight modulation zones, vibration-dampening cavities, or textured internal surfaces that interact with the surrounding pick body 102 to fine-tune pick behavior. The modularity of insert 103 introduces a novel dimension of customizability to the guitar pick, allowing musicians to adapt tonal output and feel across genres, techniques, and playing environments without requiring multiple picks. The ease of interchangeability and mechanical stability of insert 103 are central to the inventive step of this design.

Insert cavity 109, illustrated in FIGS. 3, 4, 5, and 6, is a recessed structural feature formed within the pick body 102 and dimensioned to receive the interchangeable body insert 103. This cavity is a central aspect of the invention's modular architecture, enabling the secure and precise placement of insert 103 while maintaining overall structural integrity, aesthetic continuity, and optimal acoustic performance.

In FIG. 3, insert cavity 109 is shown in perspective view, revealing its spatial orientation and contoured shape relative to the surface of pick body 102. The cavity may be centrally located or offset depending on the embodiment, and its perimeter geometry is tailored to match the external dimensions of insert 103 to ensure a stable, non-wobbling fit. FIG. 4 presents a cross-sectional view of the cavity 109, highlighting its depth, wall angle, and interface features, which may include undercuts, grooves, tabs, or lips to aid in retention and positioning of the insert.

FIG. 5 demonstrates cavity 109 in an alternate embodiment or under dynamic conditions, potentially illustrating how the cavity accommodates inserts of varying materials, shapes, or sizes. In some versions, the cavity may include a stepped or tiered internal profile to support inserts with multiple layers or compound geometries. FIG. 6 offers a cutaway view showing how the insert cavity 109 is integrated within the internal structure of pick body 102, interfacing directly with both the insert 103 and surrounding material boundaries to optimize vibrational coupling and mechanical stability.

The inner surface of cavity 109 may be textured, coated, or magnetized depending on the selected retention mechanism. Potential configurations include:

Press-fit designs using slightly compressive tolerances;

Snap-fit grooves or detents;

Magnetic coupling with embedded ferromagnetic or rare-earth elements;

Threaded or bayonet locking for advanced variants.

The cavity 109 may also include acoustic or mechanical tuning features such as micro-chambers, damping materials, or resonance channels. Its walls and floor may be constructed from the same material as the surrounding pick body 102 or may be lined with alternative materials to control insert behavior, isolate vibration, or adjust tonal response. The precise engineering of cavity 109 ensures that insert 103 is securely seated, easily replaceable, and fully integrated with the dynamic mechanics of the guitar pick.

Retention mechanism 120, depicted in FIG. 6, is a structural and/or functional element integrated within the pick body 102 and/or the insert cavity 109, configured to securely hold the interchangeable body insert 103 in place during use. This mechanism ensures that insert 103 remains stably seated within cavity 109 under dynamic playing conditions, including repeated string contact, flexion, vibration, and changes in grip pressure.

As shown in FIG. 6, retention mechanism 120 may comprise one or more mechanical, magnetic, or friction-based engagement features situated along the interior walls or base of the cavity 109 and/or the corresponding outer surfaces of insert 103. In one embodiment, retention mechanism 120 may include press-fit tolerances between the insert and cavity, relying on closely matched dimensions and material elasticity to generate a secure frictional hold. In alternative embodiments, the mechanism may utilize discrete features such as snap-fit detents, tongue-and-groove channels, resilient tabs, latching hooks, or interlocking ridges that provide positive mechanical engagement.

Magnetic coupling is another contemplated variant of retention mechanism 120, whereby one or more magnets embedded within the pick body 102 and/or insert 103 attractively align and hold the insert in place without requiring external fasteners. This configuration allows for rapid interchangeability while maintaining stability during performance.

The design of mechanism 120 may also involve asymmetric locking geometries or keyed interfaces to prevent rotational movement or misalignment of the insert 103 within the cavity 109. In some versions, component 120 may include a spring-loaded element or compressive gasket that provides constant retention force, accommodating thermal expansion, material flexure, or manufacturing tolerances.

Retention mechanism 120 is integral to the invention's modular architecture, enabling secure, repeatable placement of tonal or performance-enhancing inserts without compromising playability, pick balance, or ergonomic integrity. The mechanism may be concealed or visible, and may be constructed from the same material as the pick body or from a distinct material selected for flexibility, durability, or magnetic properties. By enabling consistent seating and easy interchange of insert 103, retention mechanism 120 contributes directly to the functional versatility, user control, and customization potential of the modular guitar pick.

(3) Ergonomic grip interface: A dedicated region of the pick designed for finger contact, often fabricated from a separate elastomeric or thermoplastic elastomer (TPE) material. This grip enhances handling comfort, reduces slippage during extended play, and may incorporate tactile patterning such as ridges, knurling, or matte finishes. In addition to improving player control, the grip contributes to overall usability for individuals with perspiring hands, dexterity limitations, or ergonomic sensitivities.

The grip 101, as depicted in FIGS. 1, 3, 4, 5, and 6, comprises a textured or contoured region on the guitar pick body specifically engineered to enhance user control, tactile responsiveness, and comfort during use. In FIG. 1, grip 101 is shown in plan view, illustrating its placement on the upper surface of the pick body 102 and its ergonomic integration with the overall pick geometry. In FIG. 3, grip 101 is depicted from an oblique angle, revealing the three-dimensional surface patterning or material differentiation (e.g., rubberized, knurled, or etched textures) that may be used to reduce slippage and facilitate stable handling under variable playing conditions. FIG. 4 presents a cross-sectional profile of grip 101, further clarifying the thickness variation or surface elevation relative to the surrounding body 102. FIG. 5 illustrates an alternate embodiment or configuration of grip 101, which may include an interchangeable or modular overlay, adhesive pad, or embedded traction-enhancing material. Finally, in FIG. 6, grip 101 is demonstrated in a cutaway view alongside adjacent internal or modular components, emphasizing its structural integration with the core pick architecture. The grip 101 may be formed integrally with the pick body or provided as a separate insert or laminate, and may utilize materials such as thermoplastic elastomers, silicone, textured polymers, or friction-enhancing coatings. Its positioning is optimized to correspond with standard finger placement zones to maximize stability during strumming and picking. Grip 101 thereby improves player control and reduces user fatigue over extended playing intervals.

The grip surface may incorporate raised texturing, knurled patterns, ridges, dimples, or matte finishes to increase frictional contact and reduce slippage during extended play sessions. Its placement is carefully aligned with common thumb and index finger positions to encourage natural hand posture and fatigue reduction. The grip may also exhibit thermal or tactile responsiveness—warming slightly during use or remaining cool to the touch—adding further comfort under varying environmental conditions such as stage lighting or outdoor performance.

In addition to functional advantages, the grip may serve aesthetic or branding purposes through color differentiation, logo embossing, or material contrast with the pick body. While not interchangeable like the insert, the grip is a critical feature in the overall ergonomic performance of the modular guitar pick system.

Figure 10:
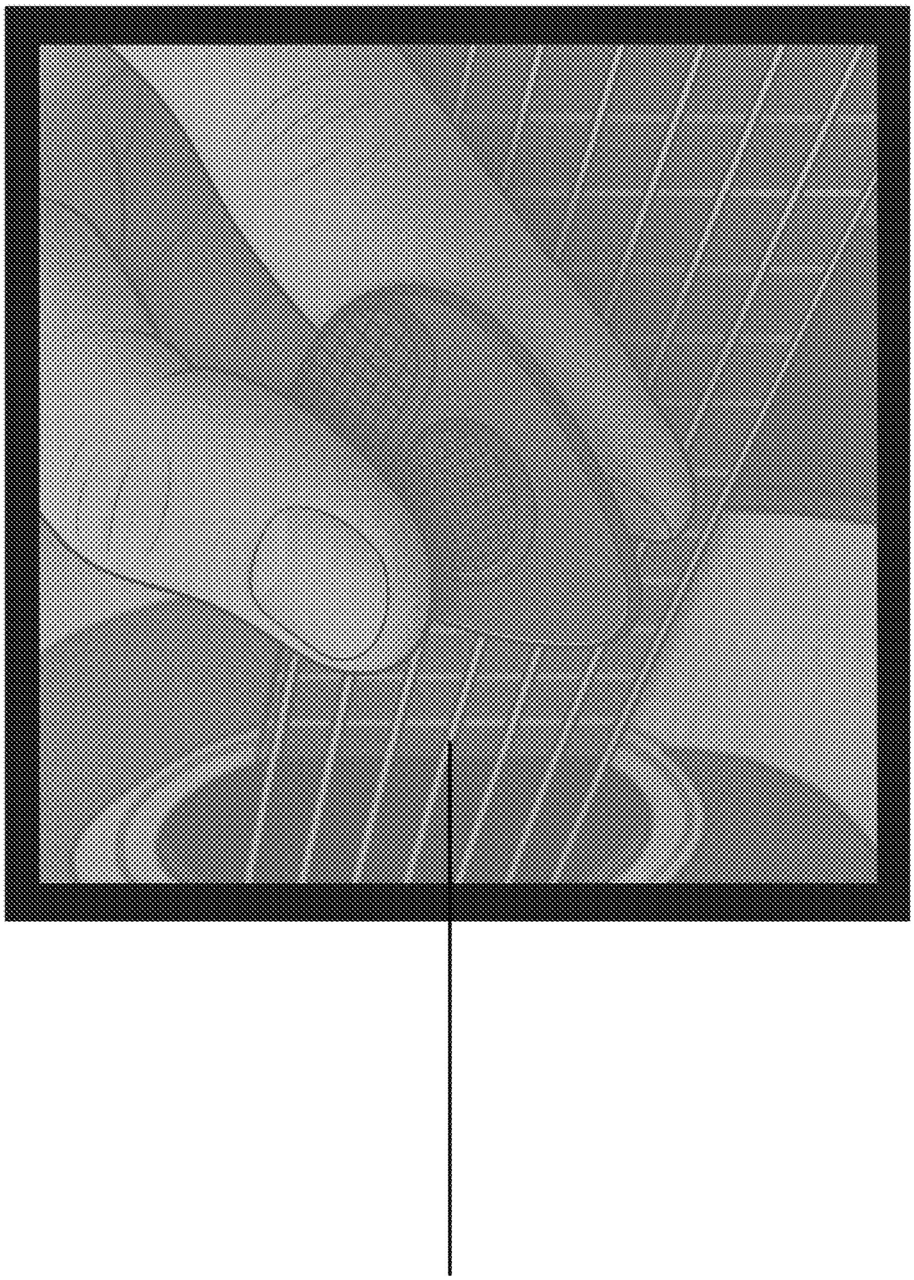
FIG. 10 is a diagram showing the guitar pick in use, being held by a user and used to pluck a guitar string, illustrating how the insert affects vibrational feedback through the pick body without contacting the string directly in accordance with another exemplary embodiment of the invention.

FIG. 10 provides a contextual illustration of the invention in operational use, showing the modular guitar pick in active engagement with the strings of a guitar. This figure is intended to demonstrate the spatial and functional relationship between the pick and the instrument during performance, highlighting the interface dynamics that underlie the tonal modulation and mechanical feedback mechanisms of the invention.

Guitar Strings (Component 205):

Guitar strings 205, as labeled in FIG. 10, represent the set of tensioned wires on the instrument that are actuated by the player using the pick. These strings may be made of steel, nickel, bronze, nylon, or other conventional materials, and their interaction with the pick is central to the production of audible sound. In FIG. 10, strings 205 are depicted from a top-down or oblique view, with the modular guitar pick shown in a representative strumming or plucking position directly above or in contact with the string surface.

This figure is used to illustrate how the invention overlays onto the guitar body during standard playing techniques such as alternate picking, strumming, or tremolo. The positioning of the pick relative to strings 205 underscores the ergonomic design of the pick body 102, the alignment of grip 101, and the articulation behavior of tip 106. The placement also visually emphasizes how the interchangeable body insert 103 and its associated cavity 109 are located outside the immediate contact zone, enabling tonal customization without disrupting the fundamental playability of the pick.

In use, the strings 205 respond dynamically to mechanical excitation from the pick. The force, angle, and velocity of contact—modulated by the design of the pick's tip 106 and the resonance properties of insert 103—affect the frequency content and amplitude of the resulting string vibration. By situating the pick within the string-contact environment of FIG. 10, the illustration reinforces the functional importance of the invention's modular architecture in influencing real-world sound generation, not merely in isolation but as part of a complete instrument system.

FIG. 10 thereby serves as a contextualizing diagram, grounding the invention within its intended application domain and visually linking structural components of the pick to the physical act of guitar playing.

1.1 Pick Body

In another embodiment, the present invention comprises a pick body. The pick body is typically triangular or tear-drop-shaped and may follow standard form factors (e.g., 351 Fender shape, Jazz III, or custom variants). It may be manufactured from rigid thermoplastics such as Ultem (PEI), Delrin (POM), or polycarbonate, chosen for their balance of flexibility and durability. The pick thickness can range from ~0.5 mm to 3 mm depending on the style, and may include additional features such as surface texturing, branding, or ergonomic grooves.

A cavity or receptacle is molded or machined into the central portion of the body, typically offset from the gripping edge to allow comfortable contact with the player's fingers. This cavity houses the interchangeable insert.

1.2 Insert

The insert is configured to snugly fit into the cavity in the pick body and may be retained by press-fit, friction lock, magnetism, snap-fit geometry, or a combination of these mechanisms. The insert can be quickly replaced without adhesives or tools.

The shape of the insert may be circular, oval, triangular, or custom-shaped. Its dimensions are chosen to affect the pick's center of mass, moment of inertia, and vibrational characteristics. The insert does not protrude beyond the pick surface and does not contact guitar strings directly.

1.3 Grip

The grip is an ergonomically optimized region of the pick designed to enhance tactile comfort, stability, and player control. It may be co-molded with the pick body or attached as a bonded or embedded surface layer. Typical grip materials include elastomers such as thermoplastic elastomer (TPE), silicone rubber, or nitrile rubber, chosen for their soft-touch texture and resistance to hand perspiration.

2. Physical Principles Behind Tonal Variation

In another embodiment, the present invention is grounded in the physics of mechanical resonance, vibrational modes, and material damping. While the pick tip initiates the string's motion, the rest of the pick—including the insert—affects how energy is stored, dissipated, and transferred back to the hand or the string.

When a pick deflects and then releases a string, the pick itself undergoes deformation and vibrational oscillations. These oscillations include:

- Bending waves (flexural vibrations) traveling through the body
- Torsional vibration, especially in thicker picks
- Local resonance, where the insert and body interact as a coupled mass-spring-damper system. The effective stiffness k, damping coefficient c, and mass m of the combined pick+insert system influence two key performance metrics:
- Natural frequency of vibration $f_n$
- Quality factor Q (a measure of resonance sharpness and vibrational decay) The formulas governing these parameters are:

$$f_n=(1/2\pi)\times\sqrt{(k/m)}$$

Where:

- $f_n$ is the natural frequency in Hz
- k is the effective stiffness of the pick system (N/m)
- m is the effective mass of the pick system (kg)

A higher k or lower m increases $f_n$, resulting in a brighter, faster tone.

A lower k or higher m decreases $f_n$, yielding a warmer, slower tone.

$$Q=\sqrt{(k\times m)}/c$$

Where:

- Q=quality factor (dimensionless, describes resonance sharpness)
- c=damping coefficient (N·s/m)

Higher Q→sharper resonance, more sustain

Lower Q→faster decay, more muted tone

By altering the mass and stiffness of the insert, we shift the pick's natural frequency and its vibrational "feel." A stiffer or denser insert increases the resonance frequency and brightness, while a damped or softer insert decreases resonance and emphasizes warmth.

Figure 9:
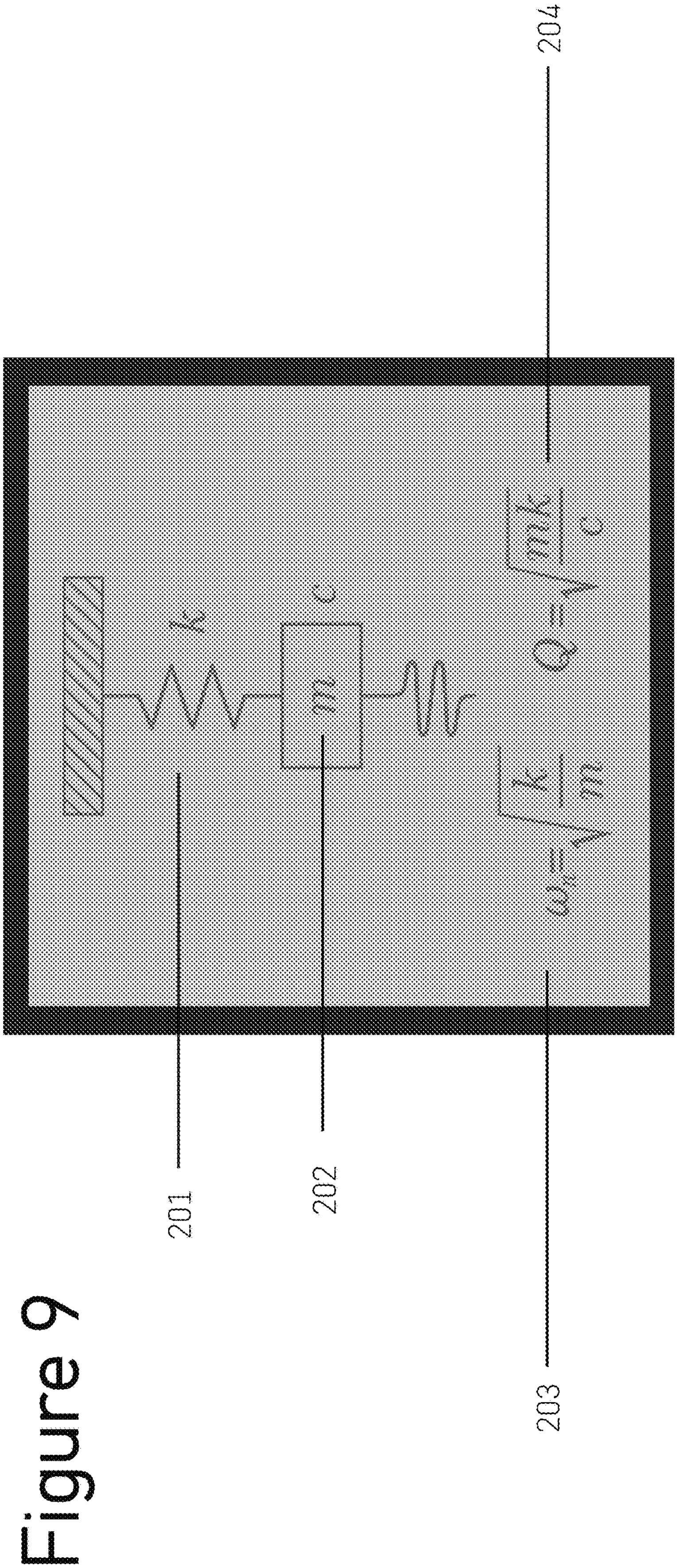
FIG. 9 is a schematic diagram of the physical model representing vibrational behavior of the pick, including a spring-mass-damper system with parameters such as stiffness (k), mass (m), damping (c), and formulas for natural frequency and quality factor in accordance with another exemplary embodiment of the invention.

FIG. 9 illustrates a conceptual diagram representing the physics-based resonance framework underlying the modular tonal modulation mechanism of the invention. This schematic model provides theoretical justification for the tonal variations produced by the interchangeable body insert 103 and its interaction with the pick body 102, framing the invention within a scientifically grounded system of mass-spring resonance dynamics and vibrational energy dissipation.

Spring (Component 201):

The spring 201 represents the elastic or compliant element in the modeled system, corresponding physically to the flexible regions of the pick body 102 and/or the insert 103. This spring-like behavior captures the restorative force that resists deformation when the pick is plucked or strikes a string. In the context of the modular guitar pick, material elasticity, pick thickness, and the structural configuration of the cavity 109 and insert 103 collectively define the effective stiffness kkk of the spring, which in turn influences the resonant frequency and responsiveness of the pick.

Mass (Component 202):

The mass 202 symbolizes the inertial component of the system and is analogous to the distributed or concentrated mass of the interchangeable insert 103 and adjacent portions of the pick body 102. The effective mass mmm affects the system's natural frequency of vibration and energy transfer to the guitar string. By varying the mass of the insert 103—through material selection (e.g., metal, polymer, wood) or geometry—the player can alter the overall dynamics of the pick, shifting tonal brightness, sustain, and attack sensitivity.

Wave Equation (Component 203):

The wave equation 203, shown in mathematical form in FIG. 9, represents the foundational differential equation governing the propagation of vibrational energy through a continuous medium—in this case, the guitar pick. This equation expresses how transverse or longitudinal waves generated by pick-string interaction travel through the body 102 and insert 103, shaping the harmonic content and tonal envelope of the resulting sound. Material properties such as Young's modulus, density, and damping coefficients inform the solution to this equation in real-world embodiments.

Q Equation (Component 204):

The Q equation 204, also depicted in FIG. 9, defines the system's quality factor Q, which characterizes the damping behavior and resonance sharpness of the mass-spring system. In the context of the modular pick, a high Q factor corresponds to low damping and a narrow resonance peak—producing a sustained, pure tone—while a low Q factor indicates high damping and broader frequency response, resulting in a more muted or rounded sound. This equation ties directly to design decisions regarding insert material (lossy vs. resonant), interface tolerances, and cavity structure. Variations in the Q-factor across different insert configurations enable musicians to achieve customized tonal effects through physical principles rather than purely subjective design. Collectively, the elements shown in FIG. 9 provide a scientific rationale for the functionality of the invention and demonstrate how resonance, damping, and vibrational coupling are deliberately manipulated through modularity to produce a range of tonal outcomes. This physics-based model reinforces the novelty of the invention by grounding its modular acoustic behavior in rigorous mechanical and vibrational theory.

3. Insert Materials and Their Effects

The user may select from a variety of insert materials depending on desired tonal and tactile outcomes:

Insert Material Comparison Table

OBJ

Insert Material Comparison Table

OBJ

Each insert behaves like a localized modifier of energy transfer, providing either energy reflection, energy dissipation, or energy absorption, depending on its viscoelastic response.

4. Acoustic and Mechanical Behavior

Material Case Studies (Tonal Profiles)

Each insert material changes k, m, and c, and thus alters $f_n$ and Q.

Case 1: Carbon Fiber Insert
- Density: ~1.6 g/$cm^3$
- Stiffness (k): Very High
- Damping (c): Very Low
- Mass (m): Moderate
- Tone: Bright, crisp, articulate
- Physics: High k, moderate m, low c→High $f_n$, High Q
- Ideal For: Lead players, arpeggios, complex runs, jazz solos Case 2: Aluminum Insert
- Density: ~2.7 g/$cm^3$
- Stiffness: High
- Damping: Low
- Mass: High
- Tone: Snappy, metallic, slightly aggressive
- Physics: High k, high m, low c→Moderate $f_n$, High Q
- Ideal For: Rock rhythm, funk strumming, punchy riffs Case 3: Brass Insert
- Density: ~8.5 g/$cm^3$
- Stiffness: Medium
- Damping: Moderate
- Mass: Very High
- Tone: Deep, warm, thick attack with added sustain
- Physics: Medium k, very high m, moderate c→Low $f_n$, Medium Q
- Ideal For: Jazz, down-tempo acoustic, warm fingerstyle Case 4: TPE (Rubber) Insert
- Density: ~1.2 g/$cm^3$
- Stiffness: Low
- Damping: High
- Mass: Low
- Tone: Soft, rounded, muted highs
- Physics: Low k, low m, high c→Low $f_n$, Low Q
- Ideal For: Studio work, classical guitar, percussive play Case 5: Wood Insert (e.g., Koa, Rosewood)
- Density: ~0.6-1.0 g/$cm^3$
- Stiffness: Medium
- Damping: Moderate to High (grain-dependent)
- Mass: Low to Moderate
- Tone: Organic, mid-heavy, natural and nuanced
- Physics: Medium k, moderate m, moderate c→Mid $f_n$, Mid Q
- Ideal For: Folk, blues, unplugged sessions Case 6: Silicone Gel Insert
- Density: ~1.0 g/$cm^3$
- Stiffness: Very Low
- Damping: Very High
- Mass: Low Tone: Extremely mellow, highly damped, almost "deadened"

Physics: Very low k, low m, very high c→Very low $f_n$, Very low Q

Ideal For: Practice picks, tactile therapy, ultra-soft fingerstyle

5. Assembly and Use

The user selects an insert and presses it into the cavity on the rear side of the pick. Depending on retention system, this can involve:

Snap: Clicks in and out with flexible tabs

Magnet: Embedded neodymium discs align the insert

Friction-fit: Slightly oversized insert compresses into cavity

Dual-material cavity: Hard outer walls, soft inner socket (like a grommet)

The insert remains secure under vigorous use, including alternate picking, strumming, tremolo, and sweep techniques.

Compatibility and Kits

The modular pick body may be sold with:

Individual insert packs (e.g., "Bright Set," "Warm Set")

Tone kits labeled by genre (Jazz, Metal, Fingerstyle)

3D-printed or CNC-machined inserts by third parties

The modular system also enables cross-compatibility: different pick shapes may share a cavity size and thus a set of common inserts.

In another embodiments, the present invention discloses a novel type of modular guitar pick that allows for interchangeable internal body inserts, each of which can be constructed from different materials and geometries to modulate the tonal characteristics, vibrational response, and tactile feedback of the pick.

In yet another embodiment, the present invention discloses altering the geometry or material composition of the pick's tip (the region of the pick that directly contacts the instrument's strings), this invention introduces an insertable element located in the body of the pick, i.e., in a region that does not directly contact the string but that plays a critical role in defining the overall mechanical and acoustic behavior of the pick. The insert is seated in a pre-formed cavity within the main body of the pick, which is designed to securely receive and retain the insert using mechanisms such as friction-fit, magnetic attraction, snap-locking features, or similar securement methods. The insert can be rapidly replaced or interchanged by the user without the need for tools or adhesives.

In still another embodiment, the present invention discloses multiple technical domains, including mechanical and acoustic engineering, materials science, product design, and the physics of musical performance. Specifically, the pick and its interchangeable insert are designed to exploit and manipulate core principles from structural dynamics—such as vibrational resonance, mass-spring-damper systems, wave propagation, and frequency response curves—to yield subtle but perceptible alterations in the tonal output produced by the instrument during performance. The modular architecture of the pick allows musicians to fine-tune their sound by selecting inserts of varying densities, stiffnesses, and damping characteristics, thus introducing a new axis of customizability that enhances expressive range and playing feel.

In still another embodiment, the present invention discloses the modular pick system as a composite structure composed of two or more interconnected components (i.e., the pick body and the modular insert), each of which contributes independently and interactively to the dynamic behavior of the whole. When a string is plucked, the pick undergoes flexural deformation and transmits vibrational energy both into the string and back into the hand of the player. The manner in which this energy is stored, dissipated, and transferred is governed not just by the pick's geometry and the stiffness of the contact tip, but also by the distribution of mass and internal damping across the body of the pick. By varying the mass and material characteristics of the body insert, one can directly affect the natural frequency of vibration of the system (as determined by the formula, $f_n=(\frac{1}{2}\pi)\times\sqrt{}(k_{ext}/m_{ext})$ where k represents the stiffness of the system and m represents its effective mass. Additionally, the damping characteristics (modeled by the quality factor $Q=\sqrt{}(k_{ext}\times m_{ext})/c$, where c=is the damping ratio) can be modulated by inserting viscoelastic or elastomeric materials that absorb or attenuate vibrational energy.

In still another embodiment, the present invention is highly relevant for both amateur and professional musicians who seek greater control over their sound palette without the need to purchase multiple single-material picks or re-learn finger techniques to compensate for tonal limitations. The modular pick is also relevant for recording engineers, studio musicians, and sound designers who require reproducibility and control over tonal subtleties during sessions. The modular insert system enables players to quickly modify pick characteristics between songs or even between sections of a composition, achieving effects akin to switching between instruments or changing playing techniques, without disrupting their workflow or performance continuity.

In yet another embodiment, the present invention opens new avenues in the design and marketing of personalized musical equipment. Because inserts can be produced in a wide range of materials (e.g., aluminum, stainless steel, brass, carbon fiber, glass-filled nylon, ABS plastic, TPEs, hardwoods, rubbers, and composites), and because these materials can be further modified through treatments like knurling, texturing, anodization, or lamination, the modular system becomes a customizable platform for a wide spectrum of tactile and acoustic preferences. Furthermore, the pick's modular nature supports aftermarket ecosystems, wherein users or third parties may design and manufacture bespoke inserts for sale or exchange.

In another embodiment, the present invention permits scalable integration with digital design tools such as parametric CAD platforms or 3D-printing systems, allowing inserts to be fabricated with precision and rapid prototyping techniques. In advanced embodiments, inserts may incorporate additional features such as embedded sensors (e.g., piezoelectric elements) to measure pressure, plucking speed, or vibration, enabling future extensions into the realm of smart or connected musical accessories.

In still another embodiment, the present invention may have applicability within the broader field of guitar picks by leveraging modular mechanical systems to introduce tonal and ergonomic customization via internal structural manipulation. This configuration both respects the familiarity of traditional pick use and significantly expands its acoustic and tactile potential, forming a bridge between the analog craft of musicianship and the physics-based tuning of engineered systems.

In another embodiment, the present invention introduces a novel, modular guitar pick architecture designed to enable musicians to customize the tonal and ergonomic behavior of their pick without altering its tip geometry or overall external profile. The central innovation lies in the incorporation of a removable body insert placed in a recessed cavity within the pick's main structure-strategically located outside the region of direct contact with guitar strings. By replacing this insert with materials of differing mechanical and physical characteristics, the pick's mass distribution, resonance behavior, vibrational response, and feel can be modulated to suit the preferences or performance needs of the player.

At its core, the system consists of four primary components:

(1) a main pick body, typically fabricated from a durable base material such as Ultem, nylon, or polycarbonate, which defines the structural foundation of the pick;

(2) a modular insert, made from a material chosen for its specific mechanical properties—such as stiffness, density, or damping capacity—designed to influence tonal output through vibrational behavior;

(3) a retention mechanism to securely fix the insert within the pick body during use, employing one or more strategies such as friction-fit, snap-fit, or magnetic coupling, and located within a precisely machined or molded cavity, typically situated in the central region of mass of the pick body (4) a textured modular grip, usually made from a high-friction, flexible material such as thermoplastic elastomer (TPE), which is affixed to the top surface of the pick to provide improved tactile handling, ergonomic comfort, and anti-slip functionality during play.

The modular insert does not contact the guitar strings. Instead, it functions as a "tuning mass" or "vibrational core," altering the way vibrational energy propagates through the pick during and after plucking. As the pick deflects under the pressure of a player's hand and then rebounds during string release, the mechanical energy imparted to the pick travels through its structure. The presence of the insert—especially if made of a stiffer or denser material—can dramatically shift the pick's resonant frequency, effective stiffness, and damping behavior, thereby influencing both sound and playability.

Customizability of Tone Through Insert Material Selection

By allowing inserts to be swapped, the system gives players access to a range of tonal profiles without needing to buy entirely new picks or adjust their playing technique. For example:

A carbon fiber insert adds stiffness and reduces internal damping, resulting in a brighter, more articulate attack.

A rubber or TPE insert increases damping, yielding a warmer, more muted tone.

A brass or copper insert adds mass and alters inertia, deepening tone and adding sustain.

A wooden insert introduces natural irregularities in vibration transmission, contributing to more organic tones.

These tonal variations are made possible without changing the tip, thereby preserving familiar picking mechanics. The musician continues to benefit from muscle memory associated with their preferred tip shape and edge geometry while exploring new soundscapes.

Ergonomic and Tactile Benefits

In addition to tonal modulation, the invention enables tactile and ergonomic adjustments that enhance the overall user experience. Both the modular grip and the interchangeable insert contribute to these benefits. The grip, typically composed of a soft-touch thermoplastic elastomer (TPE) or similar material, provides an ergonomically contoured, anti-slip surface that conforms to the player's finger placement. This feature is especially advantageous for musicians with grip issues, perspiring hands, or conditions such as arthritis, as it reduces finger fatigue and improves control during prolonged performances. Likewise, the insert may feature engineered surface treatments—such as knurling, dimpling, or elastomeric overlays—that further enhance tactile feedback. Certain inserts may also incorporate thermally responsive materials, capable of absorbing or dissipating heat from the hand, thereby maintaining a comfortable surface temperature during use, including under hot stage lights or in outdoor environments. Together, these elements offer a customizable and user-centric design that adapts to the physiological needs and playing styles of a wide range of guitarists.

Physics-Based Framework

From a mechanical engineering standpoint, the guitar pick can be modeled as a cantilevered beam with dynamic boundary conditions. The tip acts as the free end; the player's grip acts as the fixed or damped end. The central body, where the insert resides, participates in complex vibrational modes that influence how energy is stored, dissipated, and transferred during picking. The presence of an insert changes the local stiffness k, damping c, and effective mass m, and therefore shifts the natural frequency of the system according to:

$$f_n=(1/2\pi)\times\sqrt{(k_{ext}/m_{ext})}$$

Where:

$f_n$=natural frequency (Hz)

$k_{ext}$=effective stiffness of the system $m_{ext}$=effective mass of the system The quality factor, or "Q," which relates to resonance sharpness and vibrational decay, is also influenced:

$$Q=\sqrt{(k_{ext}\times m_{ext})}/c$$

Where:

k=effective stiffness

Q=quality factor (dimensionless)

c=damping coefficient (Ns/m)

m=effective mass (Kg)

Thus, different inserts produce different combinations of brightness, warmth, snappiness, and decay, all governed by well-established physical laws. Players can achieve subtle or dramatic changes by selecting appropriate inserts, effectively creating a modular tone-shaping system.

Mechanical Design and Attachment Methods

The retention of the insert within the pick body is designed for ease of use, security, and longevity. Possible configurations include:

Press-fit: the insert is slightly oversized and compresses elastically into the cavity.

Snap-fit: latches or ridges hold the insert in place with audible feedback.

Magnetic retention: magnets embedded in the pick body and/or insert attract and secure the insert.

Threaded locking: fine threads on the insert and cavity enable screwing the insert into place (less preferred for speed).

All designs aim to withstand dynamic use without the insert dislodging or vibrating independently, which could compromise tone or player confidence.

Insert Sets and Kits

The system is envisioned to be sold either as single modular picks or as kits including multiple inserts, each labeled by tonal profile, mass, material, or frequency response. For example, a "Jazz Kit" might include:

Carbon fiber (Bright/Snappy)

Mahogany (Warm/Woody)

Stainless steel (Sharp/Metallic)

This modularity also opens the door for aftermarket third-party inserts, customized 3D-printed inserts, or inserts with decorative and branding features—adding functional and aesthetic value.

Applications and Use Cases

Recording studios: where repeatability and tonal control are crucial.

Live performance: enabling players to adjust picks for different songs or acoustic environments.

Education: helping students explore how material and vibration affect tone.

Accessibility: offering players with hand fatigue or neurological differences more ergonomic options.

Compatibility and Scalability

The invention can be adapted to various pick shapes (standard, jazz, teardrop, shark fin) and thicknesses. The same insert geometry could be compatible with multiple pick body designs. Likewise, future versions could include:

Dual-insert designs (left and right wings).

Inserts with embedded sensors for smart picks.

Picks with user-tunable mass systems (e.g., adjustable ballast screws or gel inserts).

Environmental and Economic Impact

Rather than purchasing dozens of different picks to find one's preferred tone, musicians can now invest in a single high-quality body and a curated selection of inserts. This reduces material waste, manufacturing redundancy, and cost over time. Inserts can be made from recycled or biodegradable materials, further reducing environmental footprint.

In an embodiment, the present invention includes a modular guitar pick configured to alter tonal and vibrational characteristics through the use of an interchangeable body insert. The pick comprises a body including a gripping portion, a tip for engaging the strings of a musical instrument, and a body region defining a cavity. The cavity is configured to receive an insert formed from a material distinct from the pick body in at least one of: stiffness, density, damping coefficient, or modulus of elasticity. The insert does not contact the instrument strings directly but modulates the acoustic behavior of the pick by altering parameters such as natural frequency, vibrational decay, and resonant feedback.

In an embodiment, the present invention enables musicians to customize tonal response dynamically by selecting from a range of interchangeable inserts, thereby providing fine control over timbre, articulation, and feel. The invention further includes methods of use and kit configurations to support commercial deployment and user flexibility. The system is compatible with multiple musical genres and accommodates both professional and amateur musicians.

Many different arrangements of the various components depicted, as well as components not shown, are possible without departing from the spirit and scope of the present invention. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. A modular guitar pick comprising:

a pick body including a tip portion configured to engage a string of a musical instrument, a gripping portion for manual control, and a body region between the tip portion and the gripping portion;

wherein the body region defines a cavity configured to receive a removable, solid interchangeable insert; wherein the gripping portion includes an ergonomic grip layer formed of a material differing from that of the pick body, the grip layer selected to enhance tactile control, reduce slippage, or improve comfort;

and wherein the insert is mechanically retained within the cavity without adhesive, and is formed from a material differing from that of the pick body in at least one of: stiffness, density, damping coefficient, or modulus of elasticity, such that the insert alters the resonant vibrational response of the pick body as a coupled mass-spring-damper system without contacting the instrument string.

2. The modular guitar pick of claim 1, wherein the cavity is centrally located in the body region and is symmetrical relative to the pick's central longitudinal axis.

3. The modular guitar pick of claim 1, wherein the insert is retained by a press-fit mechanism, a magnetic insert-retention system, or a snap-lock geometry.

4. The modular guitar pick of claim 1, wherein the insert is reversible and replaceable without the use of tools.

5. The modular guitar pick of claim 1, wherein the insert is selected from the group consisting of: carbon fiber, aluminum, brass, thermoplastic elastomer (TPE), wood, and silicone gel.

6. The modular guitar pick of claim 1, wherein the insert modifies the effective mass m and stiffness k of the pick such that the natural frequency of vibration $f_n$ of the pick is determined by: $f_n=(½\pi)\times\sqrt{(k/m)}$.

7. The modular guitar pick of claim 6, wherein the damping coefficient c of the insert further modifies the vibrational decay of the pick, with the quality factor Q defined by: $Q=\sqrt{(k\times m)}/c$.

8. The modular guitar pick of claim 1, wherein the insert is flush-mounted with the pick surface and does not protrude from the pick's planar profile.

9. The modular guitar pick of claim 1, wherein the cavity is oval, circular, or polygonal in shape and is complementary in shape to the insert.

10. The modular guitar pick of claim 1, wherein the pick body is formed of a first material and the insert is formed of a second material having a different modulus of elasticity.

11. The modular guitar pick of claim 1, wherein the insert alters the pick's moment of inertia or center of mass.

12. The modular guitar pick of claim 1, wherein the grip layer comprises a material selected from the group consisting of: thermoplastic elastomer (TPE), silicone rubber, nitrile rubber, or polyurethane.

13. The modular guitar pick of claim 1, wherein the grip layer includes surface texturing, ridges, dimples, knurling, or matte finishes to improve frictional contact.

14. The modular guitar pick of claim 1, wherein the grip layer is thermally responsive, providing improved comfort under stage lighting or outdoor performance conditions.

15. A method for altering the tonal and vibrational characteristics of a guitar pick, comprising the steps of:

providing a guitar pick body having a cavity in its body region;

selecting an insert from a set of pre-manufactured inserts, each insert having a predetermined mass and stiffness value corresponding to a measurable change in natural frequency of the pick body; mechanically retaining the selected insert within the cavity without elastic deformation across the cavity;

and using the resulting pick to strike a stringed instrument, wherein the insert modifies the pick's natural frequency of vibration and/or damping behavior without altering the contact tip of the pick.

16. The method of claim 15, wherein each insert is labeled or encoded with its material type and tonal effect classification.

17. The method of claim 15, wherein the inserts are selected based on genre or tonal target, including jazz, rock, classical, or fingerstyle.

18. The method of claim 15, wherein the insert is removed and replaced between musical pieces or within a performance to alter timbre dynamically.

19. A modular guitar pick kit, comprising: at least one pick body having a cavity configured to receive a solid interchangeable insert selected from a plurality of inserts; wherein each insert of the plurality of inserts is mechanically retained within the cavity without adhesive, and is formed of a different material and configured to fit securely into the cavity; wherein each insert of the plurality of inserts provides a distinguishable tonal and vibrational effect such that the insert alters the resonant vibrational response of the pick body as a coupled mass-spring-damper system characteristics of the pick during use without contacting the instrument string.

20. The modular guitar pick kit of claim 19, wherein the inserts are stored in a labeled container identifying tonal characteristics, and the pick body includes an integrated or attached grip made of a comfort-enhancing material.

* * * * *